United States Patent
Chang

[11] Patent Number: 6,125,737
[45] Date of Patent: Oct. 3, 2000

[54] BAKING POT

[76] Inventor: Kwei Tang Chang, No. 14, Lane 54, Luong Chuan St., Panchiao City, Taipei Hsien, Taiwan

[21] Appl. No.: 09/505,865

[22] Filed: Feb. 17, 2000

[51] Int. Cl.[7] .............................. A23L 1/00; A47J 37/00
[52] U.S. Cl. ............................. 99/331; 99/403; 99/426; 99/450; 99/476; 219/400
[58] Field of Search ........................... 99/330–333, 339, 99/340, 348, 403, 410–417, 409, 467, 468, 473–476, 444–450, 483, 485; 34/237, 238, 195–197, 192, 200; 126/21 A, 21 R, 200, 369, 246, 261; 219/400, 401, 385–387, 492, 494, 497, 406; 312/236; 426/520–523, 509, 510

[56] References Cited

U.S. PATENT DOCUMENTS

| | | | |
|---|---|---|---|
| 208,925 | 10/1878 | Powers | 34/197 |
| 1,893,694 | 1/1933 | Bohmker | 219/400 |
| 4,065,857 | 1/1978 | Nelson et al. | 99/483 |
| 4,190,965 | 3/1980 | Erickson | 34/196 X |
| 5,215,004 | 6/1993 | Su | 99/483 |
| 5,235,906 | 8/1993 | Hsu | 99/476 X |
| 5,311,673 | 5/1994 | Su | 34/197 |
| 5,420,393 | 5/1995 | Dornbush et al. | 219/400 |
| 5,423,249 | 6/1995 | Meyer | 99/476 |
| 5,437,108 | 8/1995 | Alseth | 34/196 |
| 5,458,050 | 10/1995 | Su | 99/340 |
| 5,579,679 | 12/1996 | Hsu | 99/339 |
| 5,826,498 | 10/1998 | Su | 99/476 |

*Primary Examiner*—Timothy Simone
*Attorney, Agent, or Firm*—Rosenberg, Klein & Lee

[57] ABSTRACT

A baking pot comprises a casing, an inner pot, an electric heating tube, a fan, a protecting disk and a web type pot body. The casing has an opening at top thereof and is installed with an upper cover. The inner pot is installed within the casing. The electric heating tube is fixed within the inner pot. The fan is installed within the inner pot; and is driven by a proper dynamic force. The protecting disk is fixed within the inner pot, and is positioned atop the electric heating tube and the fan The web type pot body installed on the protecting disk. By above structure, a baking pot is formed, which is suitable for baking potato strips, potato blocks, chicken blocks, or other freezing foods.

8 Claims, 3 Drawing Sheets

BAKING POT

FIELD OF THE INVENTION

The present invention relates to a baking pot, thereby, potato strips, potato blocks, chicken blocks, or other freezing foods are cooked by baking so that the original odors of the foods are preserved without frying, therefore, the food will be not too greasy so as to effect the health of eaters.

BACKGROUND OF THE INVENTION

Conventionally, a baking pot, thereby, potato strips, potato blocks, chicken blocks, or other freezing foods are cooked by frying so that the original odors of the foods are easily lose. Moreover, the fried foods are seriously effects the health of the eaters. While the prior art way for baking potato strips, potato blocks, chicken blocks, or other freezing foods has defects of non-uniform heating and long heating time required. Therefore, the potato strips, potato blocks, chicken blocks, or other freezing foods are cooked by baking in a baking furnace.

From above description, it is known that the aforesaid conventional way for frying potato strips, potato blocks, chicken blocks, or other freezing foods has substantially many defects necessary to be improved.

SUMMARY OF THE INVENTION

Accordingly, the primary object of the present invention is to provide a baking pot comprising a casing, an inner pot, an electric heating tube, a fan, a protecting disk and a web type pot body. In the present invention, the potato strips, potato blocks, chicken blocks, or other freezing foods are cooked by baking so that the original odors of the foods are preserved without frying and as a result, the food will be not too greasy to effect the health of eaters. In particular, in the present invention, food is tightly sealed in the pot, and other than passing through the protecting disk to the web type pot body, the high temperature air generated by the electric heating tube can flow along the inner wall of the inner pot by blowing of the fan and then flow downwards through the web type pot body so to flow cyclically. Therefore, the food is heated uniformly and rapidly and thus the cooking time is greatly reduced. Thus, the present invention is suitable in baking potato strips, potato blocks, chicken blocks, or other freezing foods.

The various objects and advantages of the present invention will be more readily understood from the following detailed description when read in conjunction with the appended drawing.

DETAILED DESCRIPTION OF THE PREFERRED EMBODIMENTS

Figure 1:
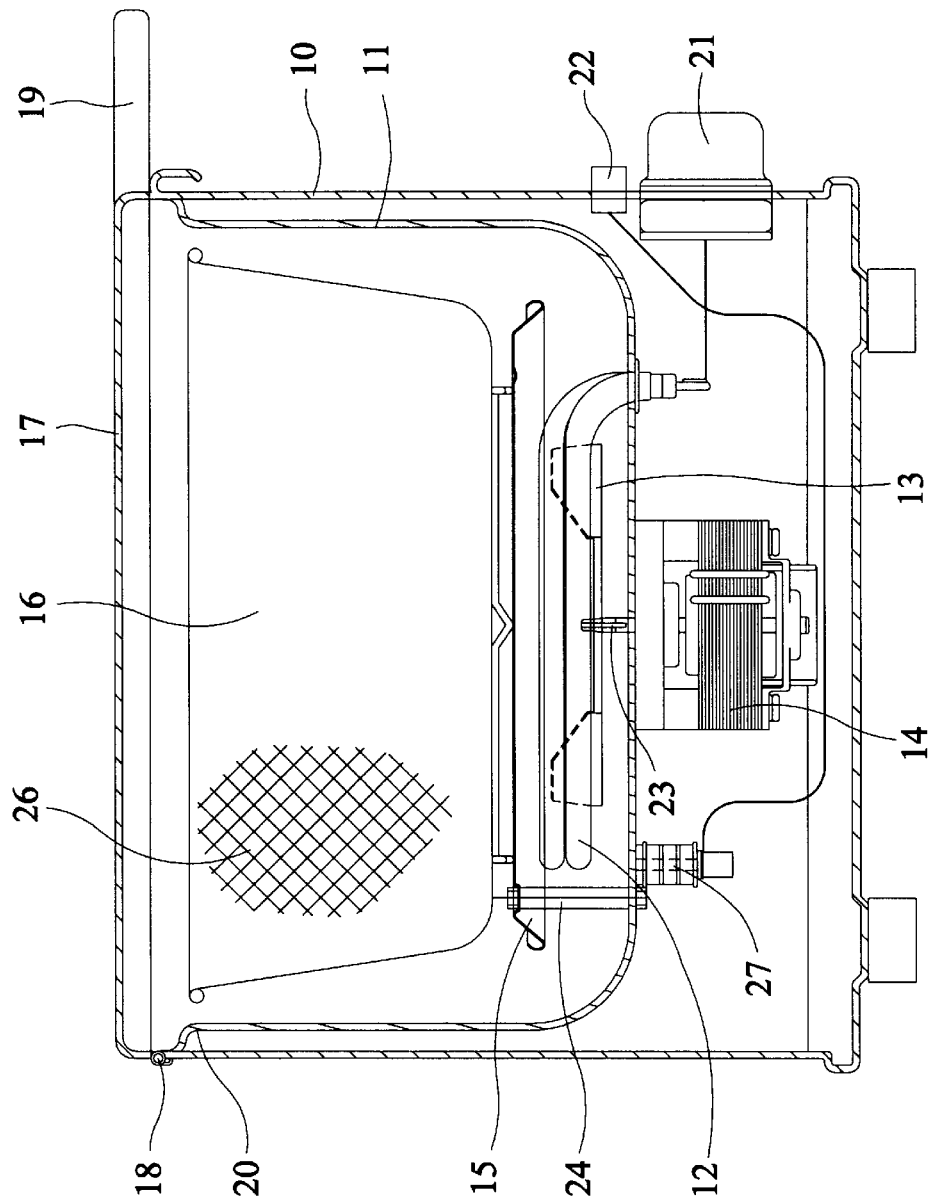
FIG. 1 is a cross sectional view of the present invention.
Figure 2:
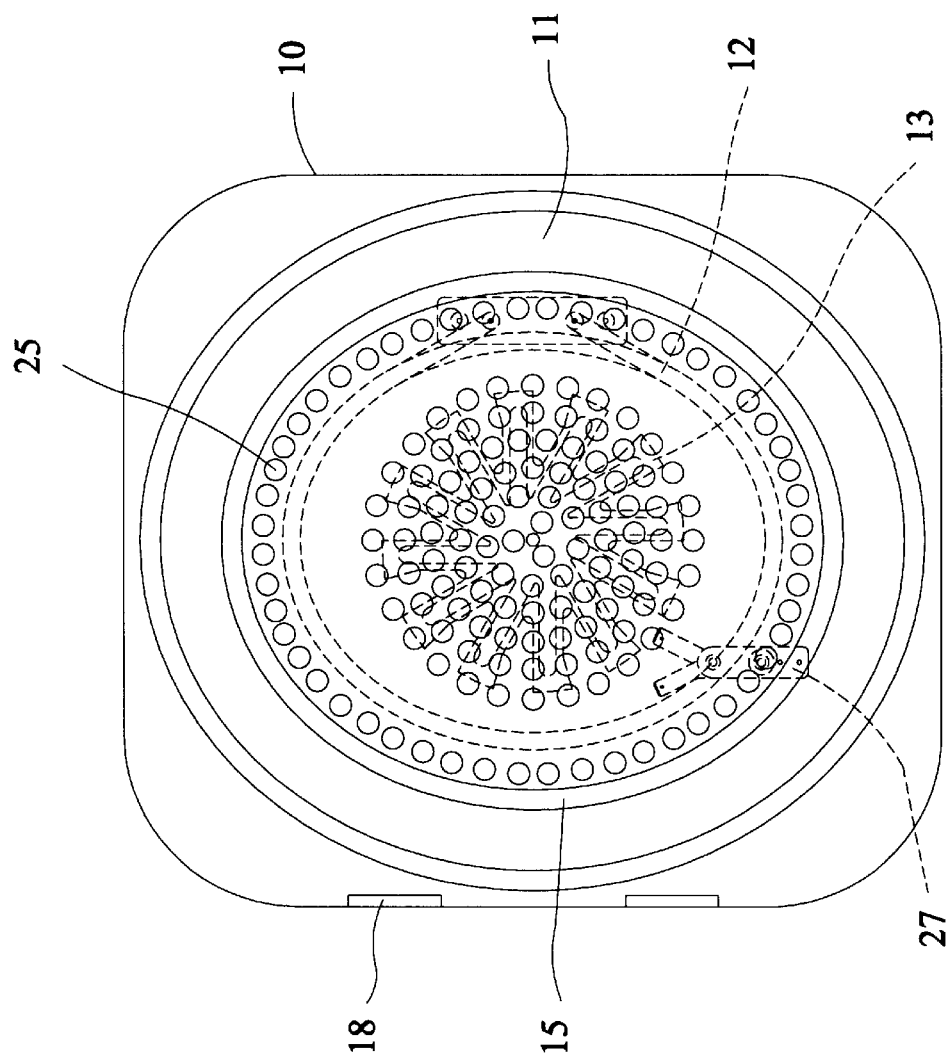
FIG. 2 is a schematic elevation view showing the present invention without the web type pot body and upper cover.

With reference to FIGS. 1 and 2, the cross sectional view and schematic view of the baking pot according to the present invention are illustrated. In the present invention. the baking pot includes a casing 10, an inner pot 11, an electric heating tube 12, a fan 13, a fan motor 14, a protecting disk 15, and a web type pot body 16. The casing 10 is a hollow case with an opening at the top thereof. The top of the casing 10 has an upper cover 17. One side of the upper cover 17 is pivotally connected to the casing 10 by two twisting wires 18. Another side of the upper cover 17 has a handle 19 for driving the upper cover 17 to open or close.

The inner pot 11 is made of metal or other material tolerant to high temperatures and is a hollow pot with an opening at the top thereof. A flange 20 is formed at the rim of the inner pot 11. Moreover, the inner pot 11 is positioned interior the casing 10 at the proper height.

The electric heating tube 12 is properly fixed within the inner pot 11 near the bottom thereof and is formed as a circle. The electric heating tube 12 is further electrically connected to a switch 21 and a temperature control button 22. The switch 21 and the temperature control button 22 are fixed to the casing 10 for controlling the operation of the electric heating tube 12. The electric heating tube 22 is electrically connected to a temperature control device 27 which is fixed to the bottom of the inner pot 11. The temperature control button 22 and the temperature control device 27 serves to control the heating temperature of the electric heating tube 12.

The fan 13 is installed within the inner pot 11 near the bottom thereof. The fan 13 is positioned within the electric heating tube 12 and can be driven by a proper dynamic force.

The fan motor 14 is installed at the bottom of the inner pot 11 and is fixed properly. The dynamic output shaft 23 of the fan motor 14 penetrates upwards into the inner pot 11. The fan 13 is fixed to the dynamic output shaft 23 so that by the fan motor 14, the fan 13 can be driven properly to rotate. The fan motor 14 is electrically connected to the switch 21 in order to control the operation of the fan motor 14 through the switch 21.

The protecting disk 15 is properly fixed within the inner pot 11 near the bottom. The protecting disk 15 is made of metal or other material with good conductivity, and is formed with a plurality of holes 25 for being passed by air. The protecting disk 15 is positioned atop the electric heating tube 12 and the fan 13 for protecting the electric heating tube 12 and the fan 13.

The web type pot body 16 is made of metal or other high temperature tolerant material and is a hollow pot with an opening atop thereof. The web type pot body 16 is arranged with web holes 26 and is installed on the protecting disk 15. By aforesaid structure, a baking pot is formed.

Figure 3:
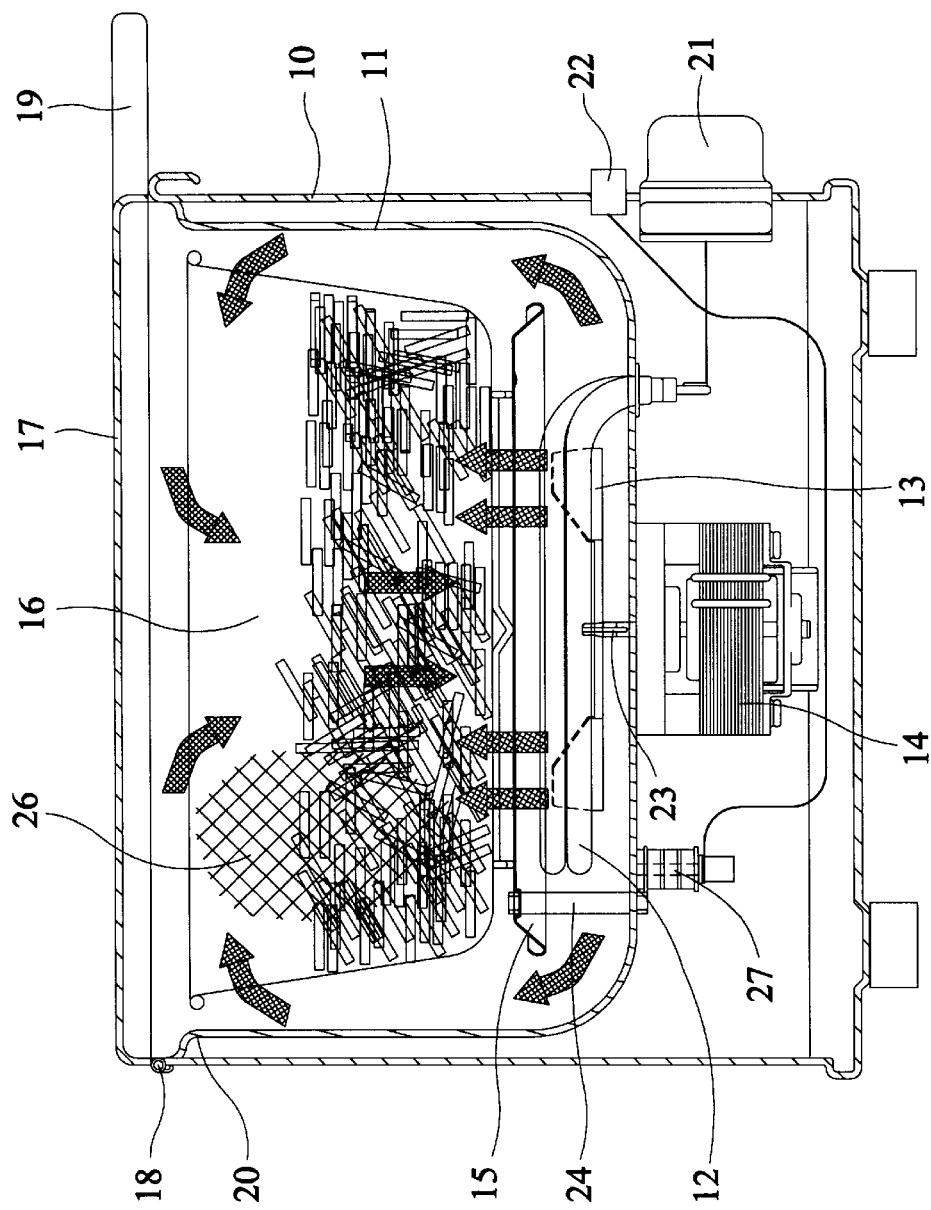
FIG. 3 is a schematic view showing the use of the present invention.

With reference to FIG. 3, a schematic view showing the use of the present invention is illustrated. The potato strips, potato blocks, chicken blocks, or other freezing foods (not shown) can be put on the web type pot body 16. Then the upper cover 17 covers. Then, the electric heating tube 12 and the fan 13 are actuated to operate. Other than passing through the protecting disk 15 to the web type pot body 16, the high temperature air generated by the electric heating tube 12 can flow along the inner wall of the inner pot 11 by blowing of the fan 13 and then flow downwards through the web type pot body 16 so as to flow cyclically and thus to further baking the foods with the web type pot body. 16.

In the present invention, the potato strips, potato blocks, chicken blocks, or other freezing foods is cooked by baking so that the original odors of the foods are preserved without frying and thus the food will be not too greasy so as to effect the health of eaters. In particular, in the present invention, food is tightly sealed in the pot, and other than passing through the protecting disk 15 to the web type pot body 16, the high temperature air generated by the electric heating tube 12 can flow along the inner wall of the inner pot 11 by blowing of the fan 13 and then flow downwards through the web type pot body 16 so to flow cyclically. Therefore, the food is heated uniformly and rapidly and thus the cooking time is greatly reduced. The present invention is suitable in baking potato strips, potato blocks, chicken blocks, or other freezing foods.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A baking pot comprising:

a casing having an opening at a top thereof and being installed with an upper cover;

an inner pot installed within the casing;

an electric heating tube being fixed within the inner pot;

a fan installed within the inner pot; and being driven by a proper dynamic force;

a protecting disk being passed through by air and being fixed within the inner pot, the protecting disk being positioned atop the electric heating tube and the fan; and a web type pot body installed on the protecting disk.

2. The baking pot as claimed in claim 1, wherein the upper cover is pivotally connected to the casing through twisting wires.

3. The baking pot as claimed in claim 1, wherein one side of the upper cover is formed with a handle for opening the cover.

4. The baking pot as claimed in claim 1, wherein the electric heating tube is connected to a switch, and the switch is fixed to the casing.

5. The baking pot as claimed in claim 1, wherein the electric heating tube is connected to a temperature control button, and the temperature control button is connected to a temperature control device which is fixed to the bottom of the inner pot.

6. The baking pot as claimed in claim 1, wherein the fan is positioned within the electric heating tube.

7. The baking pot as claimed in claim 1, wherein the bottom of the inner pot is installed with a fan motor, and the fan is fixed to the dynamic output shaft of the fan motor so that the fan is driven by the fan motor.

8. The baking pot as claimed in claim 1, wherein a plurality of holes are disposed on the protecting disk.

* * * * *